United States Patent
Seybold et al.

(10) Patent No.: US 9,446,486 B2
(45) Date of Patent: Sep. 20, 2016

(54) INTERNAL HEAT EXCHANGER FOR A MOTOR VEHICLE AIR-CONDITIONING SYSTEM

(71) Applicant: GM GLOBAL TECHNOLOGY OPERATIONS LLC, Detroit, MI (US)

(72) Inventors: Lothar Seybold, Nauheim (DE); Kai-Ove Pietsch, Weiterstadt (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 267 days.

(21) Appl. No.: 14/078,646

(22) Filed: Nov. 13, 2013

(65) Prior Publication Data

US 2014/0137595 A1    May 22, 2014

(30) Foreign Application Priority Data

Nov. 15, 2012 (DE) .................. 10 2012 022 363

(51) Int. Cl.
| | |
|---|---|
| B23P 15/26 | (2006.01) |
| F28F 1/40 | (2006.01) |
| F28D 7/10 | (2006.01) |
| B60H 1/00 | (2006.01) |
| F28D 21/00 | (2006.01) |

(52) U.S. Cl.
CPC .............. B23P 15/26 (2013.01); F28D 7/106 (2013.01); F28F 1/40 (2013.01); B60H 1/00342 (2013.01); F28D 2021/008 (2013.01); F28D 2021/0061 (2013.01); Y10T 29/49361 (2015.01)

(58) Field of Classification Search
CPC ........... B23P 15/26; F25F 1/40; F28D 7/106; F28D 2021/0061; F28D 2021/008; Y10T 29/49361; B60H 1/00342
See application file for complete search history.

(56) References Cited

U.S. PATENT DOCUMENTS

| | | | | |
|---|---|---|---|---|
| 6,009,908 A | * | 1/2000 | Hartnagel | .......... B60H 1/00342 138/109 |
| 8,231,142 B2 | | 7/2012 | Olver | |
| 2007/0000651 A1 | * | 1/2007 | Guo | ........................ F28F 1/426 165/133 |
| 2009/0166019 A1 | | 7/2009 | Tokizaki et al. | |
| 2010/0239366 A1 | * | 9/2010 | Bahr | ..................... F16B 13/141 403/268 |
| 2010/0326640 A1 | * | 12/2010 | Higashiyama | ......... B21D 53/06 165/154 |
| 2011/0073208 A1 | * | 3/2011 | Nakamura | ................ F16L 7/00 138/114 |

FOREIGN PATENT DOCUMENTS

| | | | | |
|---|---|---|---|---|
| EP | 1101638 A1 | * | 5/2001 | ......... B60H 1/00342 |
| JP | 2009204166 A | | 9/2009 | |
| WO | 2010069602 A2 | | 6/2010 | |

OTHER PUBLICATIONS

Search Report issued in GB1318576.4 completed Jun. 16, 2014.

* cited by examiner

*Primary Examiner* — Emmanuel Duke
(74) *Attorney, Agent, or Firm* — Lorenz & Kopf, LLP

(57) ABSTRACT

A heat exchanger is provided for a motor vehicle air-conditioning system with an inner tube and with an outer tube, which at least in regions encloses the inner tube in the region of a line portion subject to forming an intermediate space in tube longitudinal direction through which a heat exchanger medium can flow. The intermediate space at least in portions is subdivided into at least three flow channels with at least three webs running in tube longitudinal direction, which open into a distribution or manifold space formed through radial expansion of the outer tube, in which the webs compared with the line portion have a smaller extension in radial direction.

19 Claims, 3 Drawing Sheets

A-A

B-B

C-C

INTERNAL HEAT EXCHANGER FOR A MOTOR VEHICLE AIR-CONDITIONING SYSTEM

CROSS-REFERENCE TO RELATED APPLICATION

This application claims priority to German Patent Application No. 10 2012 022 363.3, filed Nov. 15, 2012, which is incorporated herein by reference in its entirety.

TECHNICAL FIELD

The technical field relates to a heat exchanger for a motor vehicle air-conditioning system, which is designed in particular as an internal heat exchanger for increasing the efficiency of the air-conditioning system.

BACKGROUND

To increase the output and efficiency of motor vehicle air-conditioning systems, air-conditioning system-internal heat exchangers, so-called internal heat exchangers (IHX) are known, which thermally couple a section of the refrigerant circuit running between evaporator and compressor to a section of the refrigerant circuit running between condenser and expansion valve. In this way, the relatively cold refrigerant flowing from the evaporator to the compressor can be employed for pre-cooling or super-cooling of the comparatively warm refrigerant fed to the expansion device on the high-pressure side of the refrigerant circuit.

For optimizing the mode of operation of such heat exchangers in the refrigerant circuit, the geometrical dimensions and shapes of the tubes are important. In an existing vehicle package, which hardly offers any room for the individual adaptation or changing of the outer contour or outer geometry of the heat exchanger, it is relatively difficult to adapt such heat exchangers to given requirements individually, for example vehicle type-specifically, with regard to their heat exchanger capacity.

Internal heat exchangers can furthermore be designed as coaxial tube heat exchangers. Here, at least one inner tube is completely enclosed by an outer tube in circumferential direction. In the interior space of the inner tube and in the intermediate space between inner and outer tube, an exchange of thermal energy between the heat exchanger medium which in each case flows in the opposite flow direction can then take place. For connecting coaxial tube heat exchangers into the refrigerant circuit of an air-conditioning system it is necessary to lead the inner tube through the outer tube or provide a suitable connection for the outer tube surrounding the inner tube.

EP 1 101 638 A1, for example, describes a tube arrangement with at least one connector. The connector in this case has a cylindrical shape with a cavity and a first passage through a first longitudinal end. The inner tube in this case extends through the first passage and through the cavity. The connector furthermore contains a radially expanded opening at an end of the cavity in order to receive an outer tube. Here, the outer tube is connected to the connector via a press fit.

Providing a separate connector on the one hand increases the number of components for an internal heat exchanger. On the other hand, the manufacturing and assembly process for such connection solutions becomes comparatively complex. Since the tubes during the operation of the heat exchanger later on are supplied with a pressurized heat exchanger medium, a fluid-tight, pressure-stable and durable connection of the individual components has to be ensured.

In view of the foregoing, at least one object is to provide an improved internal heat exchanger for a motor vehicle air-conditioning system that can be produced particularly efficiently, cost-effectively and simply. At least another object is to provide a component reduction and by a possible weight minimization and a long lifespan as well as a good thermal load capacity. In addition, other objects, desirable features and characteristics will become apparent from the subsequent summary and detailed description, and the appended claims, taken in conjunction with the accompanying drawings and this background.

SUMMARY

Accordingly, a heat exchanger is provided for a motor vehicle air-conditioning system, which comprises an inner tube and an outer tube. The outer tube at least in portions encloses the inner tube subject to forming at least one intermediate space in tube longitudinal direction (z) through which a heat exchanger medium can flow. In tube circumferential direction (u), the outer tube by contrast surrounds the inner tube completely. The intermediate space formed by outer tube and inner tube is approximately annular in the cross-sectional shape and can be penetrated by one or by a plurality of webs, which radially extend between inner tube and outer tube.

Here it is provided that the intermediate space between inner tube and outer tube in the region of a line portion of the outer tube is at least in portions subdivided into at least three flow channels with at least three webs running in tube longitudinal direction, which open into a distribution or manifold space formed through radial expansion of the outer tube. In the distribution or manifold space, the webs have a radial extension which is smaller compared with the line portion adjoining in longitudinal direction. However, the webs are nevertheless present in the distribution or manifold space and preferably extend continuously from the line portion into the radially expanded distribution or manifold portion of the outer tube adjoining thereon.

In that the outer tube is radially expanded towards the outside in the region of the distribution or manifold space, a heat exchanger medium fed to the heat exchanger can be distributed in the region of the heat exchanger portion about the inner tube acting as distribution space and consequently in circumferential direction (u) over the adjoining flow channels formed by the webs. Advantageously and preferably a corresponding radial expansion of the outer tube is provided at a longitudinal end of the heat exchanger located opposite, which will then act as a manifold space for the heat exchanger medium flowing out of the flow channels.

The radial expansion of the outer tube for forming a manifold space makes possible a fluidic joining of the heat exchanger medium downstream of the flow channels in order to feed the heat exchanger medium into the refrigerant circuit of the internal heat exchanger for example via a single drain or outlet.

Here it is provided that the at least one distribution or manifold space formed through radial expansion of the outer tube is provided with webs, which adjoining the distribution or manifold space, namely in the region of the line portion, form individual flow channels in the intermediate space between inner tube and outer tube. The providing or presence of the at least three webs in the region of the distribution or manifold space appears to be disadvantageous for a distribution or manifold function of the radially expanded region of the outer tube upon superficial consideration.

By reducing the radial extension of the webs, a possible effect originating from the webs and supposedly impairing the distribution or manifold function, however can be at least partially or even almost completely compensated. In the region of the distribution or manifold space, the webs are preferably subject to a transforming Thus, the webs can be displaced into the material of the outer tube approximately radially to the outside and accordingly have a lower radial extension. Here it is provided in particular that the webs in the region of the distribution or manifold space are not removed but merely transformed or displaced at least partially.

For it is possible in this way to achieve a non-cutting and largely clean working of the outer tube. In contrast with a working of the outer tube that removes the webs, a subsequent cleaning of the outer tube in this case is not mandatorily required. The unitary configuration of the outer tube for forming a radially expanded distribution or manifold space proves to be advantageous also before the background of a component reduction and assembly simplification.

According to a further embodiment, the at least three webs extend in the region of the distribution or manifold space in a cross-sectional plane extending perpendicularly to the tube longitudinal direction (z) at a predetermined angle of inclination that is greater than approximately 0° to a radial direction (r) with respect to the center point of the inner tube. A transforming of the webs in this case takes place in the form of a lateral inclination, i.e., in circumferential direction of the outer tube.

Forming webs which with respect to the radial direction are inclined in the region of the radially expanded manifold or distribution space can on the one hand result in the reduction of the radial height of the webs. On the other hand, the inclined forming of the webs can lead to an advantageous swirling or mixing-through of the fed-in heat exchanger medium on the part of the distribution space.

In this respect, such webs that are for example provided in the region of a radially expanded distribution space and are orientated inclined in circumferential as well as radial direction can develop an effect promoting the heat exchange between inner tube and outer tube.

According to a further embodiment, the at least three webs extend from an inner side of the outer tube radially to the inside and in circumferential direction (u). An at least partial orientation of the webs in circumferential direction, i.e. at a predetermined angle of inclination with respect to the radial direction, is demanded at least in the region of the radially expanded distribution or manifold space, i.e. in such regions in which the webs are not in contact with the inner tube. In such regions, in which the webs however subdivide the intermediate space between inner tube and outer tube into individual flow channels which are separated from one another, the webs can also be orientated in radial direction (r), for example radially to the inside and accordingly have an angle of inclination with respect to the radial direction of approximately 0°. However, it is also conceivable that the webs both in the region of the radially expanded distribution or manifold space as well as in the region of the adjoining flow channels between inner tube and outer tube are orientated at a predetermined angle of inclination with respect to the radial direction.

In terms of production, the forming of the webs on the inner side of the outer tube proves to be advantageous in that the webs formed on the outer tube radially to the inside need not be removed for example during the course of a mechanical working of the outer tube, for example for forming the radially expanded distribution or manifold space, but are merely subjected to a transforming in particular an inclination with respect to the radial direction.

According to a further embodiment, the webs at the outer tube are formed unitarily. The webs for example can be produced and formed quasi cost-neutrally during the manufacture of the outer tube for example during the course of an extrusion process. A separate assembly process or a fastening of individual webs on the outer tube can thus be advantageously omitted. According to a further embodiment, the outer tube and the inner tube radially support themselves radially to one another via the webs in the line portion of the outer tube adjoining the distribution or manifold portion.

The line portion adjoining the distribution or manifold portion in longitudinal direction in this case acts as a heat exchanger section of the heat exchanger. In the region of that line portion, the inner and the outer tube support themselves radially via the webs preferably formed on the inner side of the outer tube. With the webs, the inner and the outer tube can be pushed into one another and for forming the intermediate space through which the heat exchanger medium is to flow can be kept at a predetermined radial distance from one another.

Here it is conceivable, furthermore that the geometrical dimensions of the inner tube on the one hand and of the outer tube provided with the webs which project radially to the inside are designed on the other hand such that the inner tube can be fixed in the outer tube largely frictionally joined or non-positively joined in tube longitudinal direction. In this regard, not only a radial fixing but also a mutual fixing of the tubes in tube longitudinal direction can take place via the webs provided between inner and outer tube.

According to a further embodiment, the webs in the region of the line portions extend at an angle of inclination of approximately 0°, approximately 5°, approximately 10°, approximately 20°, approximately 30°, approximately 40° or approximately 45° to the radial direction (r). Through at least slightly inclined webs in the region of the line portion, the joining of inner and outer tube can be simplified. Thus, webs, which are at least slightly inclined in circumferential direction, can provide elasticity during the joining into one another of inner and outer tube even if it is only slight. Furthermore, the inclination of the webs can prove to be advantageous in the region of the line portion in terms of production, namely in particular for forming an inclination of the webs in the region of the adjoining distribution or manifold space that is greater compared thereto.

In this regard, it is provided furthermore according to a further development that the angle of inclination of the webs in the region of the distribution or manifold space is greater than the angle of inclination of the webs in the region of the adjoining line portion. Such different angles of inclination are advantageous for the respective demanded flow conditions in the line portion and in the distribution or manifold space. Through comparatively large angles of inclination of the webs in the region of the distribution or manifold space, a region about which a flow can circulate about the inner tube in circumferential direction can be maximized.

Advantageously, the angle of inclination of the webs in the region of the distribution or manifold space amounts to approximately 45°, approximately 60°, approximately 75° or approximately 80°. Here it is conceivable that the webs are orientated inclined in the region of the distribution of manifold space in circumferential direction of the outer tube. Here it is even conceivable that the webs are inclined in the region of the distribution or manifold space in such a manner that their free ends come to lie against the inner wall of the outer tube. In such a configuration, a distribution or manifold space through which heat exchanger medium can flow can be extensively maximized while maintaining the geometry of the outer tube.

According to a further embodiment, the inner tube penetrates a radially tapered end portion of the outer tube in a fluid-tight manner. The end portion of the outer tube in this case is provided directly adjoining the distribution or manifold space, on a side that is located opposite the adjoining line portion. In the region of its for example free end portion facing away from the line portion, the radially expanded distribution or manifold space is designed radially tapered in such a manner that the preferably cylindrically formed inner tube comes to lie against the outer tube and is encased by the outer tube in a fluid-tight manner.

Through the radially tapered configuration of the outer tube, a fluid-tight mutual leading-through of inner tube and outer tube can be realized. A connecting component to be separately formed and to be separately connected to the inner tube and to the outer tube can thus be advantageously omitted. Through the direct leading-through of the inner tube through the radially tapered end portion of the outer tube the number of components for the heat exchanger in this respect can be advantageously reduced.

According to a further embodiment, the end portion of the outer tube including the webs provided there is connected to the inner tube in a non-positive and/or materially joined manner. In particular, inner tube and outer tube can be crimped together. Alternatively as well as additionally to this, the end portion of the outer tube and the inner tube can be materially joined, for example welded together or soldered together in the region of the mutual penetration.

According to a further embodiment, the outer tube is formed as a high-pressure line and the inner tube has a low-pressure line. An inflow for the intermediate space in this case can be arranged downstream of a condenser, an outflow of the intermediate space can be arranged upstream of an expansion device, an inflow for the inner tube can be arranged downstream of an evaporator and an outflow of the inner tube can be arranged upstream of a compressor in the refrigerant circuit of a motor vehicle air-conditioning system.

While inflow and outflow for the inner tube can be directly connected to corresponding components of the motor vehicle air-conditioning system in a fluid-conducting manner, the outflow and the inflow for the intermediate space of the heat exchanger are each provided in the region of the radially expanded distribution or manifold space. Inflow and outflow in this case can approximately in radial direction adjoin the expanded distribution or manifold portion of the outer tube. Outflow and inflow for the distribution or manifold space can in this case be connected as connecting socket to the radially expanded distribution or manifold space of the outer tube and connected therewith in a fluid-tight manner. Here it is true in general that the low-pressure lines are designed for the fluidic coupling of evaporator and compressor, the high-pressure lines by contrast for the fluidic coupling of condenser and expansion device of the refrigerant circuit of the air-conditioning system and accordingly can be connected to the mentioned components of the air-conditioning system in a fluid-conducting manner.

The inner tube of the heat exchanger is largely subjected to a gaseous heat exchanger medium through-flow during the operation of the heat exchanger or during the operation of the air-conditioning system, while the outer tube or the intermediate space formed by inner tube and outer tube and subdivided by webs into individual flow channels can largely be subjected to a compressed fluid through-flow. The inner tube and the intermediate space between inner and outer tube can preferably be subjected to a through-flow according to the counterflow principle, which makes possible an improved heat exchange compared with the parallel flow principle.

According to a further embodiment, a motor vehicle air-conditioning system with a refrigerant circuit is finally provided, which fluidically couples together a compressor, a condenser, an expansion device and an evaporator for circulating a heat exchanger medium. Here, the refrigerant circuit furthermore comprises a previously described heat exchanger, whose intermediate space is fluidically incorporated between condenser and expansion device and whose inner tube is fluidically incorporated between evaporator and compressor of the refrigerant circuit.

In this way, a heat exchange serving for the output and efficiency increase of the air-conditioning system between the low-pressure side located downstream of the evaporator and the high-pressure side of the refrigerant circuit located upstream of the expansion device can be provided.

In a further embodiment, a motor vehicle is finally provided with a previously described air-conditioning system or with at least one previously described heat exchanger formed approximately coaxially and tubular. Furthermore, a method for producing a heat exchanger described before is provided. The method in this case comprises the steps providing an outer tube provided with webs radially projecting to the inside, radial expansion of a free end portion of the outer tube in regions for forming a distribution or manifold space, inserting the inner tube into the outer tube, transforming of the expanded end portion directed radially to the inside and fluid-tight connecting of the end portion to the inner tube.

Here it is provided in particular that an end portion of the outer tube that is provided with webs that are radially directed to the inside is radially expanded without the webs having to be removed for example in a cutting operation beforehand. It is also finally provided here that the transforming which is directed radially to the inside for the fluid-tight connecting of the end portion of the outer tube to the inner tube takes place with the webs located between inner and outer tube, but which are then preferably inclined towards the side and in circumferential direction. In that the webs of the outer tube remain in the outer tube, a non-cutting joining and production process for the heat exchanger can be provided.

In that according to a further embodiment the webs of the outer tube during the course of the expanding of the outer tube are inclined in circumferential or tangential direction and transformed accordingly, a removal of the webs from the outer tube for example through cutting or milling can be omitted. In this way, at least one production step, namely a removing of the webs by cutting as well as a cleaning procedure which is otherwise required thereafter can be omitted. Furthermore, the entire production area can be kept comparatively simple, neat and clean through a joining of inner and outer tube without cutting, which ultimately benefits the quality of the produced heat exchangers.

Finally, according to a further embodiment of the production method, the outer tube is provided with webs that are orientated inclined radially to the inside and to the radial direction during the course of an extrusion process. In that an outer tube already provided with webs that are orientated inclined to the radial direction is already provided prior to an expanding of an outer tube end portion, an inclination direction or transforming direction of the webs for the process of expanding the outer tube can be inherently predetermined.

Expanding at least one end portion of the outer tube can take place, for example, by sliding the outer tube onto a conically expanding expansion mandrel. A suitable expansion tool in this case can be in the free end of the extruded outer tube in axial or longitudinal direction. If required, expanding can also take place with an expansion mandrel rotating in circumferential direction, whose direction of rotation is matched to an inclination of the webs of the outer tube in the event such as already predetermined. In the case of a rotating expansion tool, however, outer tubes can also be used which in an initial state merely comprise webs which are directed towards the inside but are not inclined.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
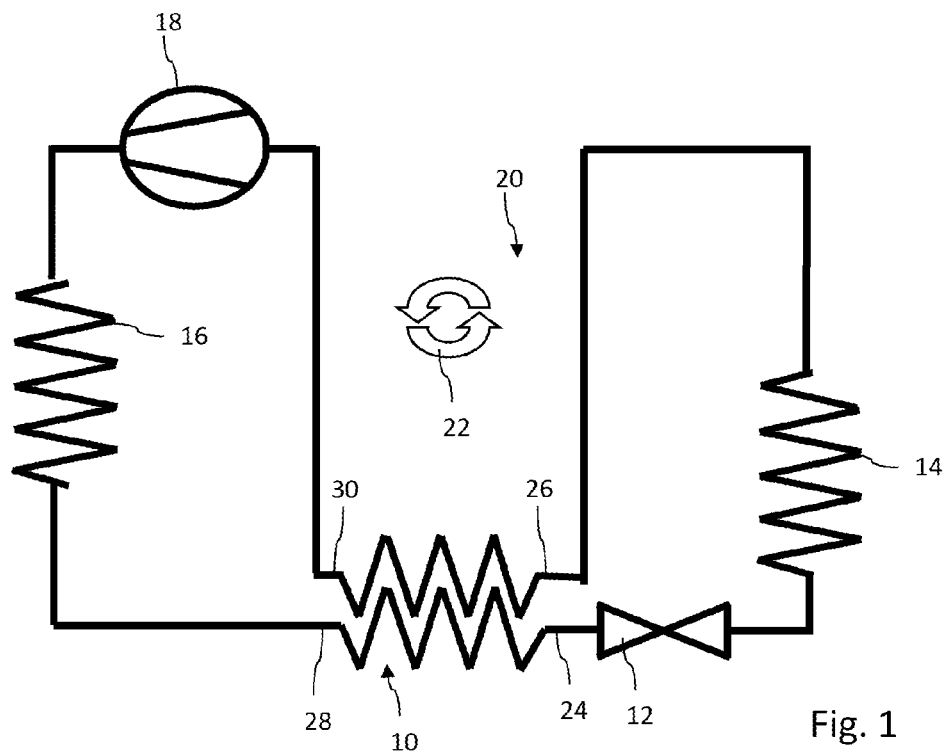
FIG. 1 is a schematic representation of a motor vehicle air-conditioning system with an internal heat exchanger.

The motor vehicle air-conditioning system 20 schematically shown in FIG. 1 has a refrigerant circuit 22, which fluidically connects the individual air-conditioning system components compressor 18, condenser 16, an expansion device 12 as well as an evaporator 14 to one another in a manner known per se. An internal heat exchanger 10 in this case is arranged on the high-pressure side downstream of the condenser 16 and upstream of the expansion device 12. On the low-pressure side, the internal heat exchanger 10 is provided downstream of the evaporator 14 and upstream of the compressor 18.

A heat exchanger medium that is under a comparatively high pressure and high temperature is super cooled positioned in front of the expansion device 12 through the heat exchanger medium flowing in the heat exchanger 10 in opposite direction from the evaporator 14 to the compressor 18 and which is under comparatively low pressure and low temperature. Through this internal heat exchange in the refrigerant circuit 22, the efficiency of the motor vehicle air-conditioning system 20 can be improved as a whole.

Figure 2:
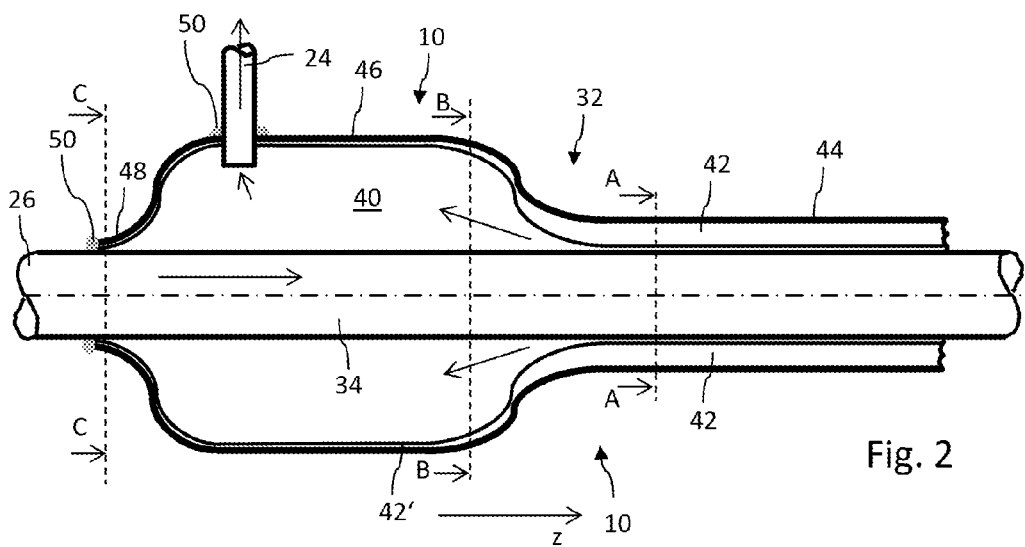
FIG. 2 is a cross-section through an end of the heat exchanger in longitudinal direction.
Figure 3:
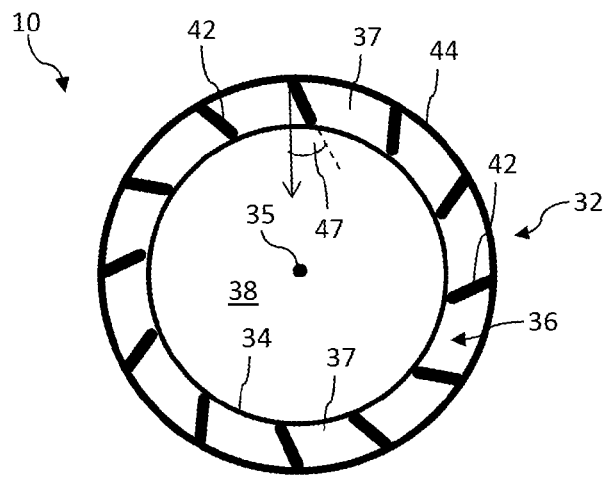
FIG. 3 is a cross-section along A-A through the heat exchanger according to FIG. 2.
Figure 4:
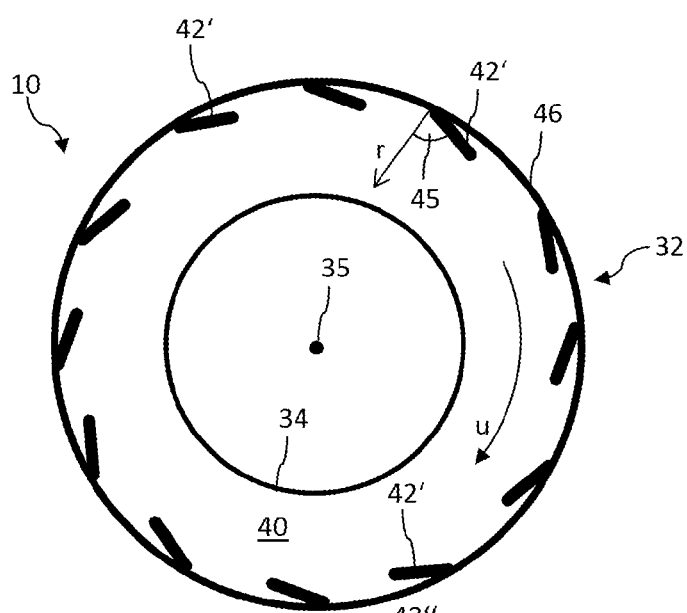
FIG. 4 is a cross-section along B-B through the heat exchanger according to FIG. 2.
Figure 5:
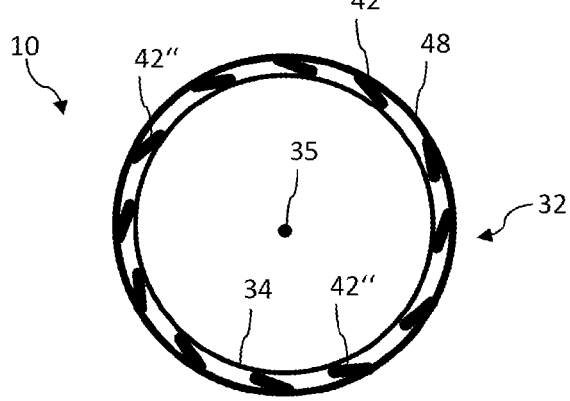
FIG. 5 is a further cross-section along C-C through the heat exchanger according to FIG. 2.

The internal heat exchanger 10 provided here comprises an approximately cylindrical outer tube 32 and an inner tube 34 arranged coaxially thereto according to the representation according to FIG. 2 and according to the three cross-sectional representations according to FIG. 3 to FIG. 5. The inner tube 34 in this case is formed as a low-pressure line and can be incorporated in the refrigerant circuit 22 of the air-conditioning system 20 via an inflow 26 downstream of the evaporator 14 and via an outflow 30 upstream of the compressor 18.

In the representation according to FIG. 2, the outer tube 32 comprises three portions adjoining one another in tube longitudinal direction (z) and directly merging into one another, namely a line portion 44, a distribution or manifold portion 46 and an end portion 48. In the region of the line portion 44 acting as heat exchange section, which is shown in the cross section according to FIG. 3, the outer tube 32 comprises a plurality of webs 42 which project to the inside in an approximately oblique or inclined manner to a radial direction (r), between which individual flow channels 37 are formed, through which heat exchange medium can flow.

An angle of the inclined webs 42 marked with reference number 47 with respect to the radial direction in this case amounts to approximately 0°, but preferably less than approximately 45°. The free ends of the webs 42 directed radially to the inside come to lie against an outer side of the inner tube 34 and thus serve for the mutual radial supporting of inner tube 34 and outer tube 32. Heat exchanger 10 can be operated in particular according to the counterflow principle. The interior space 38 of the inner tube 34 can be subjected to the heat exchanger medium through-flow in opposite direction to the flow channels 37 of the intermediate space 36 formed between inner tube 34 and outer tube.

By way of that counterflow principle, an efficient heat exchange between the heat exchanger medium which is subject to comparatively low pressure and comparatively low temperature in the interior space 38 of the inner tube 34 with the heat exchanger medium flowing through the flow channels 37 which is subject to comparatively high pressure and high temperature is possible. In longitudinal direction (z) adjoining the line portion 44, the outer tube 32 has a radially expanded distribution or manifold portion 46. Through the radial expansion, as is shown in FIG. 4 in cross section B-B, the heat exchanger medium flowing through the individual flow channels 37 can flow about the inner tube 34 in circumferential direction (u) in the distribution space 40 and for example be directed to an outflow 24 radially adjoining the distribution or manifold portion 46.

At the other end and not shown in FIG. 2, a distribution portion 46 of the outer tube 32 acting as a distribution space (40) can be formed in a corresponding manner. A distribution portion 46 correspondingly formed on another end of the heat exchanger 10 is preferably provided with a radially adjoining inflow 28 penetrating the outer tube 32, via which the heat exchanger medium flowing from the condenser 16 and which is under comparatively high pressure can be directed into a corresponding distribution space 40 and from there be distributed over the flow channels 37 of the line portion 44 which are fluidically connected therewith.

As is evident from FIG. 2 as well as from a comparison of FIG. 3 and FIG. 4, the distribution or manifold portion 46 of the outer tube 32 is formed radially expanded relative to the adjoining line portion 44, while the inner tube 34 in those regions adjoining one another in tube longitudinal direction (z) has a diameter which remains largely the same. In the region of the distribution or manifold portion 46, the webs 42' are likewise present. They continuously extend from the line portion 44 into the distribution or manifold portion 46 of the outer tube 32.

However, the angle of inclination 45 of the inclined webs 42' in the region of the distribution or manifold portion 46 of the outer tube 32 is greater than in the region of the line portion 44. The greater inclination of the webs 42' relative to the webs 42 of the line portion 44 favors the flow conditions in the distribution or manifold space 40. Thus, the inclined webs 42' can by all means project up to the inner side 33 of the outer tube 32 or even come to lie against it.

FIG. 4 furthermore schematically shows the center point 35 of the inner tube 34. Through the coaxial configuration and arrangement of inner tube 34 and outer tube 32, that center point 35 simultaneously also forms the geometrical center point of the outer tube 32. The greater inclination of the webs 42' of the distribution or manifold portion 46 relative to the webs of the line portion 44 can be effected during the course of an expansion process of an approximately free end portion of a provided outer tube 32. If, for example, an outer tube 32 provided with webs 42 which are radially directed to the inside but slightly inclined with respect to the radial direction (r) is provided, both a radial expansion and forming, in particular cold forming of the outer tube 32 for forming a distribution or manifold portion 46 can be achieved by inserting an expanding tool into the interior of the outer tube 32 provided with webs 42. At the same time, the inclination of the webs 42' can be enlarged through the radial expanding of the outer tube 32.

In the cross section according to FIG. 2 it is clearly evident that the radial extension or the radial component of the webs 42 in the region of the line portion 44 is greater than the radial extension of the webs 42', which in the adjoining distribution or manifold portion 46 are subject to a further transforming or inclination directed in circumferential direction. In the cross section according to FIG. 5 the radially tapered end portion 48 or connecting portion of the outer tube 32 is finally shown in cross section. There, the outer tube 32 is preferably crimped to the passed-through inner tube 30, as a result of which the webs 42" located in between can be subjected to a further forming or inclination orientated in circumferential direction. In addition to a press fit or a crimping of the end portions 48 of the outer tube 32 and of the inner tube 34 passed-through on the face end, the end portion 48 of the outer tube 32 and the inner tube 34 can be fluidically connected to one another.

Thus, the crimped end portion 48 of the outer tube 32 for example can be soldered or welded to the inner tube 34 via a soldered or welded joint. Similarly, the outflow 24 can penetrate the side wall of the heat exchanger 10, thus the distribution or manifold portion 46 of the outer tube 32 in radial direction and accordingly be welded or soldered to the outer tube 32 for admitting the heat exchanger medium to the intermediate space 36.

Figure 6:
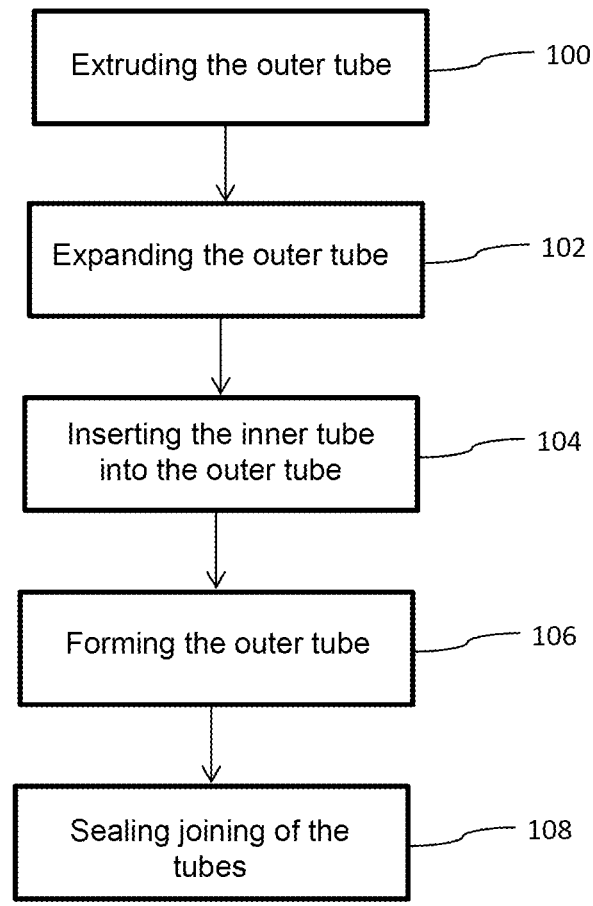
FIG. 6 is a flow diagram of a production method for producing the heat exchanger.

The flow diagram according to FIG. 6 sketches once more the possible method steps for producing the previously described heat exchanger 10, in a first step 100 an outer tube 32 is extruded for example here or during the course of an extrusion process inherently provided with webs 42 radially directed to the inside. Here, the webs 42 need not already be orientated inclined relative to the radial direction in a starting configuration.

In a following process step 102, at least one free end of the provided outer tube 32 is radially expanded. Here, the webs 42 provided on the inside 33 of the outer tube 32 are either inclined further or for the first time in circumferential direction (u) and accordingly transformed. After that expansion procedure, the inner tube 34 is introduced into the outer tube 32 which is expanded at least in regions in a following step 104.

Finally, in a following process step 106, a free end portion of the outer tube 32 is radially crimped to the inside, so that the radially expanded distribution or manifold space 40 can be sealed towards the outside. Finally, in the step 108, the sealing connection of inner tube 34 and outer tube 32 has to be formed in the region of the end portion 48 of the outer tube 32. For example, the end portion 48 of the outer tube 32 crimped accordingly can be soldered or welded to the inner tube 34.

Instead of a configuration of the webs 42 inclined in circumferential direction, it is conceivable, furthermore, in the region of the distribution or manifold space 40 that although the webs 42 are orientated in radial direction (r), they nevertheless have a radial extension which compared with the adjoining line portion 44 is small.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A heat exchanger for a motor vehicle air-conditioning system, comprising:
    an inner tube; and
    an outer tube that at least in regions encloses the inner tube in a region of a line portion subject to forming an intermediate space in a tube longitudinal direction through which a heat exchanger medium can flow,
    wherein the intermediate space at least in portions is subdivided into at least three flow channels with at least three webs running in the tube longitudinal direction, which open into a space formed through radial expansion of the outer tube, in which the at least three webs compared with the line portion have a smaller extension in radial direction, and
    wherein the webs in the space extend from the outer tube, in a cross-sectional plane that extends substantially perpendicularly to the tube longitudinal direction, at a predetermined angle of inclination, which is taken with respect to a radial axis that is perpendicular to the longitudinal direction, that is greater than approximately 0° with respect a radius through a center point of the inner tube.

2. The heat exchanger according to claim 1, wherein the at least three webs extend from an inner side of the outer tube radially to the inside and in a circumferential direction.

3. The heat exchanger according to claim 1, wherein the webs and the outer tube are formed unitarily.

4. The heat exchanger according to claim 1, wherein the outer tube and the inner tube radially support themselves via the at least three webs in the line portion of the outer tube adjoining the space portion.

5. The heat exchanger according to claim 1, wherein the at least three webs in the region of the line portion extend from the outer tube at an angle of inclination of approximately 0° with respect the radius through the center point of the inner tube.

6. The heat exchanger according to claim 5, wherein the angle of inclination of the at least three webs in the region of the space portion is greater than the angle of inclination of the at least three webs in the region of the line portion.

7. The heat exchanger according to claim 1, wherein the inner tube penetrates a radially tapered end portion of the outer tube in a fluid-tight manner.

8. The heat exchanger according to claim 7, wherein the radially tapered end portion end portion of the outer tube including the at least three webs is connected to the inner tube by way of a non-positively joined manner.

9. The heat exchanger according to claim 1, wherein the outer tube is formed as a high-pressure line and the inner tube is formed as a low-pressure line,
wherein an inflow for the intermediate space is arranged downstream of a condenser,
wherein an outflow of the intermediate space is arranged upstream of an expansion device,
wherein an inflow for the inner tube is arranged downstream of an evaporator, and
wherein an outflow of the inner tube is arranged upstream of a compressor in a refrigerant circuit of a motor vehicle air-conditioning system.

10. A motor vehicle air-conditioning system, comprising:
a refrigerant circuit that fluidically couples at least one compressor, a condenser, an expansion device, and an evaporator that are configured to circulate a heat exchanger medium to one another and which furthermore comprises a heat exchanger, the heat exchanger comprising:
an inner tube; and
an outer tube that at least in regions encloses the inner tube in a region of a line portion subject to forming an intermediate space in a tube longitudinal direction through which a heat exchanger medium can flow,
wherein the intermediate space at least in portions is subdivided into at least three flow channels with at least three webs running in the tube longitudinal direction, which open into a space formed through radial expansion of the outer tube, in which the at least three webs compared with the line portion have a smaller extension in radial direction, and
wherein the webs in the space extend from the outer tube, in a cross-sectional plane that extends substantially perpendicularly to the tube longitudinal direction, at a predetermined angle of inclination, which is taken with respect to a radial axis that is perpendicular to the longitudinal direction, that is greater than approximately 0° with respect a radius through a center point of the inner tube.

11. A method for producing a heat exchanger, comprising:
providing an outer tube provided with at least three webs that radially project to at a predetermined angle of inclination, which is taken with respect to a radial axis that is perpendicular to the longitudinal direction, that is greater than approximately 0° with respect a radius through a center point of the outer tube;
radial expanding in regions of at least one end portion of the outer tube for forming a space;
inserting the inner tube into the outer tube;
transforming of the free end of the expanded end portion of the outer tube radially directed to the inside; and
fluid-tight joining of the radially tapered end portion end portion, which is radially transformed to the inside, to the inner tube.

12. The method according to claim 11, wherein the at least three webs of the outer tube during an expanding of the outer tube are inclined in a circumferential direction.

13. The method according to claim 11, wherein the outer tube during an extrusion process is provided with the at least three webs that are orientated radially to the inside and inclined with respect to the radial direction.

14. The motor vehicle air-conditioning system according to claim 10, wherein the webs in the space extend in a cross-sectional plane that extends substantially perpendicularly to the tube longitudinal direction at a predetermined angle of inclination that is greater than approximately 0° with respect to a radial direction with respect to a center point of the inner tube.

15. The motor vehicle air-conditioning system according to claim 10, wherein the at least three webs extend from an inner side of the outer tube radially to the inside and in a circumferential direction.

16. The motor vehicle air-conditioning system according to claim 10, wherein the webs and the outer tube are formed unitarily.

17. The motor vehicle air-conditioning system according to claim 10, wherein the outer tube and the inner tube radially support themselves via the at least three webs in the line portion of the outer tube adjoining the space portion.

18. The motor vehicle air-conditioning system according to claim 10, wherein the at least three webs in the region of the line portion extend from the outer tube at an angle of inclination of approximately 0° with respect the radius through the center point of the inner tube.

19. The motor vehicle air-conditioning system according to claim 10, wherein the angle of inclination of the at least three webs in the region of the space portion is greater than the angle of inclination of the at least three webs in the region of the line portion.

* * * * *